W. WALES.
Microscope.

No. 46,511.  Patented Feb. 21, 1865.

WITNESSES
Jas. P. Hall
Peter Cooke

INVENTOR
William Wales

UNITED STATES PATENT OFFICE.

WILLIAM WALES, OF FORT LEE, NEW JERSEY.

IMPROVEMENT IN MICROSCOPES.

Specification forming part of Letters Patent No. 46,511, dated February 21, 1865.

*To all whom it may concern:*

Be it known that I, WILLIAM WALES, of Fort Lee, in the county of Bergen and State of New Jersey, have invented a new and useful Improvement in Microscopes; and I do hereby declare that the following is a full, clear, and exact description thereof, which will enable those skilled in the art to make and use the same, reference being had to the accompanying drawings, forming part of this specification, in which—

Figure 1:
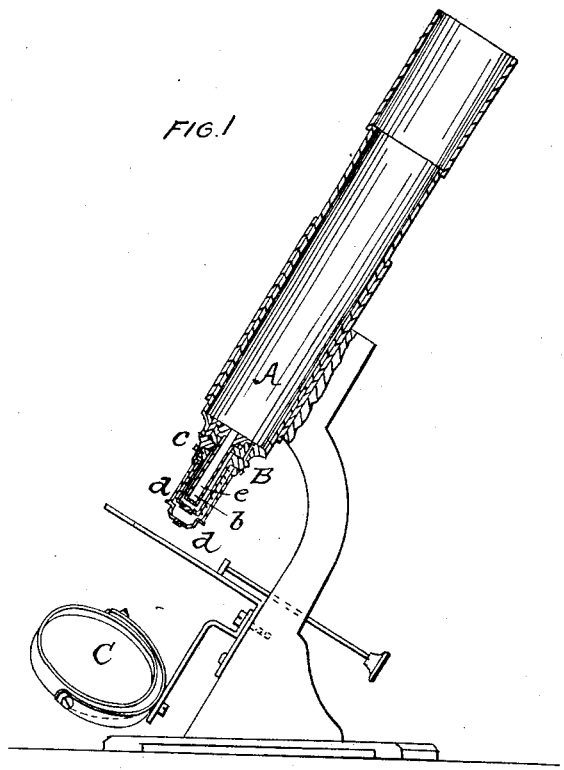
Figure 2:
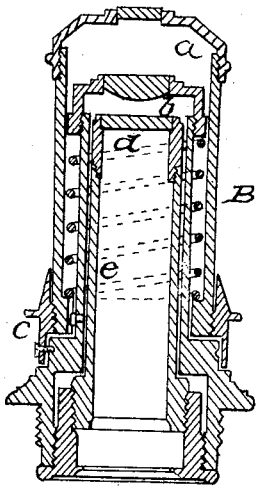
Figure 3:
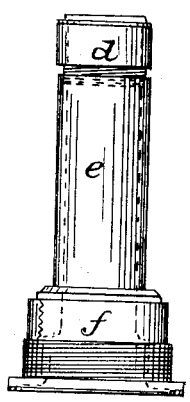

Figure 1 is a longitudinal central section of this invention. Fig. 2 is a similar section of the lens-tube detached in a larger scale than the previous figure. Fig. 3 is a detached elevation of the back tube.

Similar letters of reference indicate corresponding parts.

This invention consists in the application of two or more back lenses or correctors, in combination with the same microscope object-glass in such a manner that the angle of aperture left for central reflected light is equal to that for oblique or angular light, in contradistinction to the use of two or more front lenses, which have to be changed and shifted to be adapted to central and oblique light.

A represents the tube of a microscope, constructed of brass or any other suitable material in the ordinary form and manner. In its top end the eye glass is to be fitted, and its bottom end is provided with a screw-thread to receive and hold the tube B, containing the object-glass $a$ and back lens $b$. The object-glass is arranged in the usual manner, and it is provided with adjusting-sleeve $c$, that serves to adjust the object glass to the thickness of the diaphragm or screen, to which the object is attached. The back lens, $b$, is secured in a cap, $d$, which is screwed on the inner end of the tube $e$, and this tube is secured by a screw-thread, $f$, in the inner end of the object-glass tube B, as clearly shown in Figs. 1 and 2 of the drawings. By unscrewing the back tube $e$ the cap $d$, containing the back lens, can be taken off and replaced by one of a different nature without disturbing the object-glass.

In order to correct the lens or object glass for oblique reflected light and for central reflected light, two different sets of back lenses have to be supplied, the first intended to correct the object-glass for central reflected light and the second for oblique reflected light.

The mirror C, which is used to reflect the light, is secured in a swivel-arm in the usual manner, so that it can be brought in different positions. If the center of said mirror coincides with a line drawn through the longitudinal center of the tube A, or of the lens-tube, the light reflected by it on the object is central reflected light, and when its center does not coincide with the axis of the tube A the light reflected by it on the object under the microscope is oblique reflected light. For different kinds of light different corrections have to be made, particularly to destroy the colors and render the object-glass achromatic, and this correction is generally made by changing the object-glass $a$ and replacing it by one of a different nature. In doing this repeatedly the correct position of the object-lens is easily disturbed and the value of the whole instrument is deteriorated.

By my invention the object-lens can be left undisturbed and the desired change can be produced with facility and with little loss of time. By providing each instrument with two or more back lenses the object-glass can be readily adjusted for all changes in the light in which it may be used.

I claim as new and desire to secure by Letters Patent—

The application of two or more back lenses or correctors, in combination with the same microscope object-glass, constructed and operating substantially as and for the purpose set forth.

WILLIAM WALES.

Witnesses:
 JAMES P. HALL,
 PETER COOKE.